April 20, 1937.  F. SPINA ET AL  2,077,440
MACHINERY FOR PRESSING CLOTHING
Filed Jan. 18, 1935  8 Sheets-Sheet 1

Inventors
Frank Spina
Charles G. Green
By Arthur F. Durand
Atty.

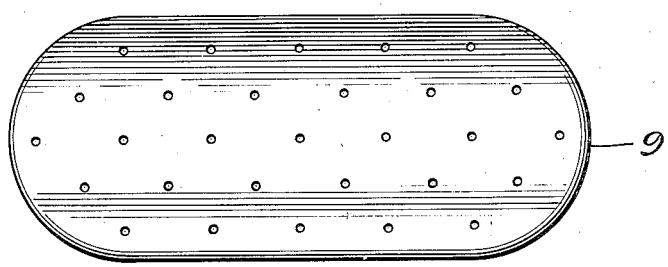
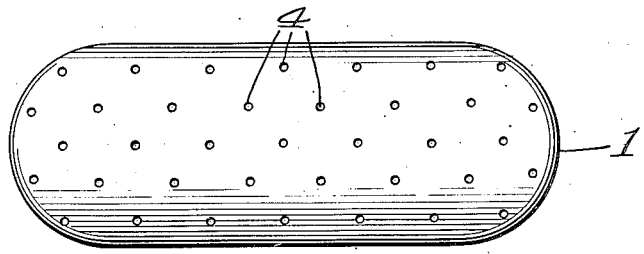
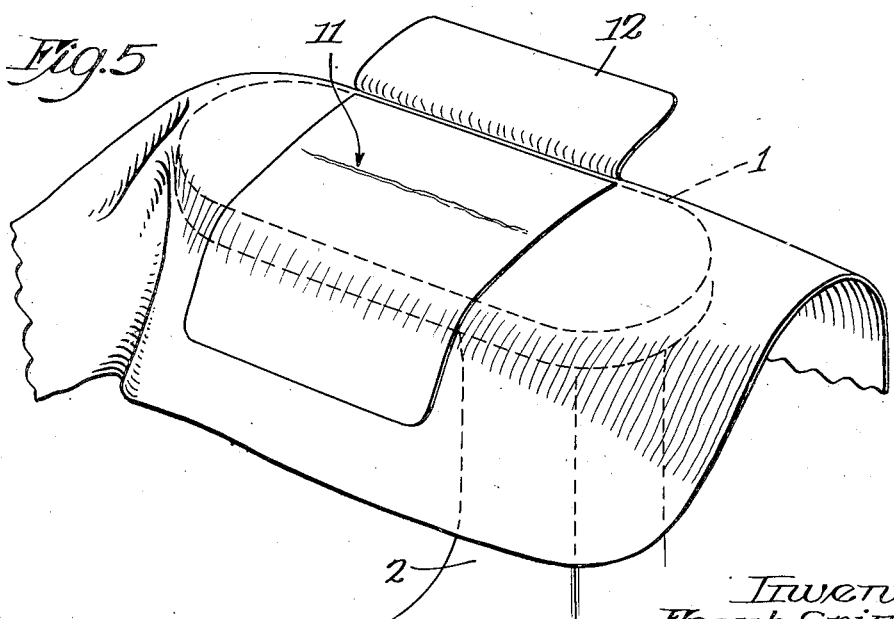

April 20, 1937.   F. SPINA ET AL   2,077,440
MACHINERY FOR PRESSING CLOTHING
Filed Jan. 18, 1935   8 Sheets-Sheet 5

Inventors
Frank Spina
Charles G. Green
By Arthur H. Durand
Atty.

April 20, 1937. F. SPINA ET AL 2,077,440
MACHINERY FOR PRESSING CLOTHING
Filed Jan. 18, 1935   8 Sheets-Sheet 6
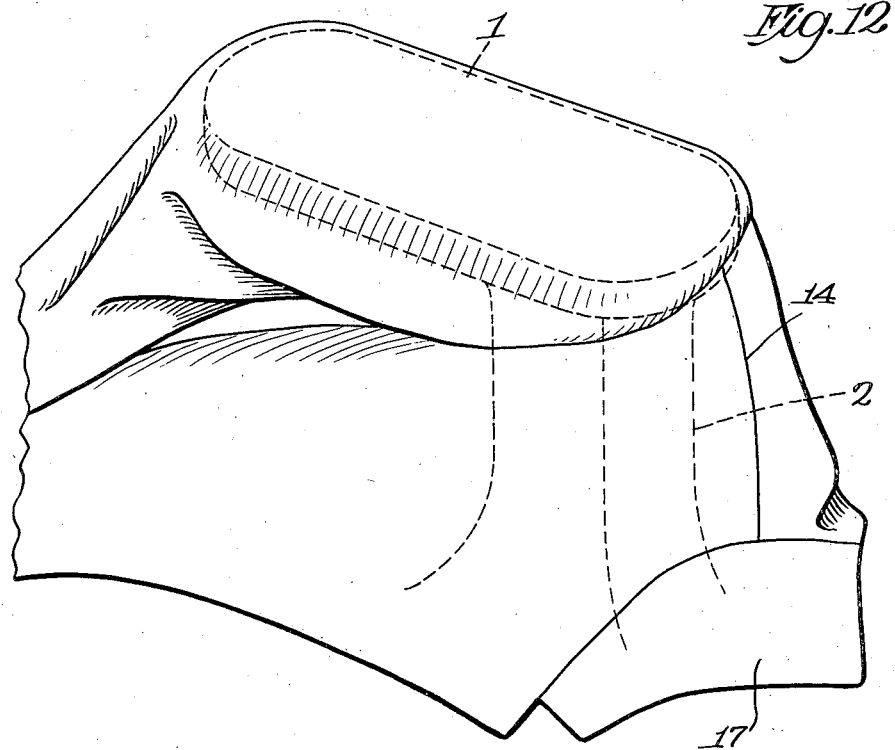
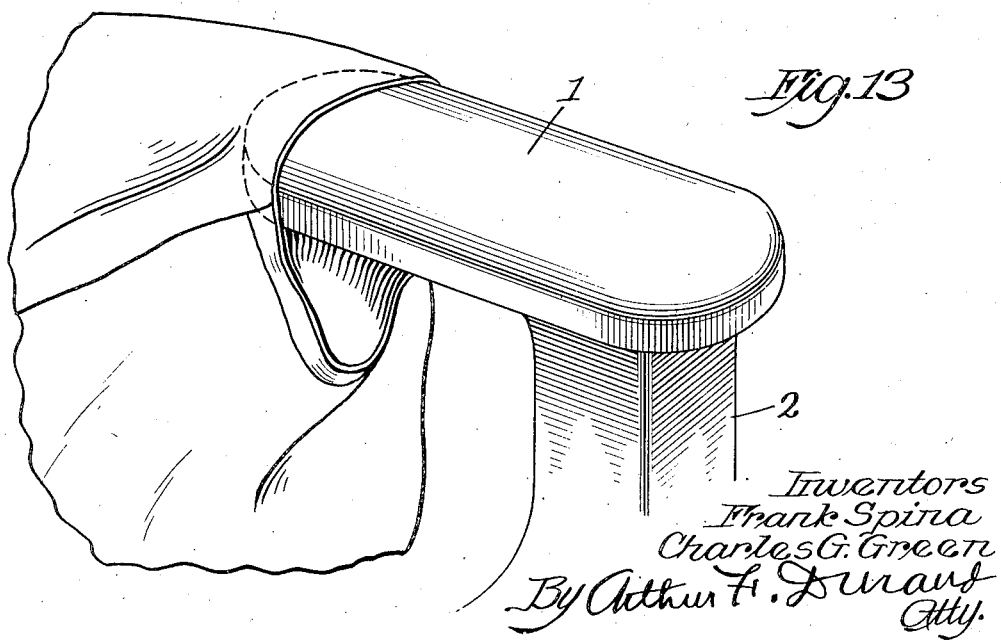

April 20, 1937.  F. SPINA ET AL  2,077,440
MACHINERY FOR PRESSING CLOTHING
Filed Jan. 18, 1935  8 Sheets-Sheet 7
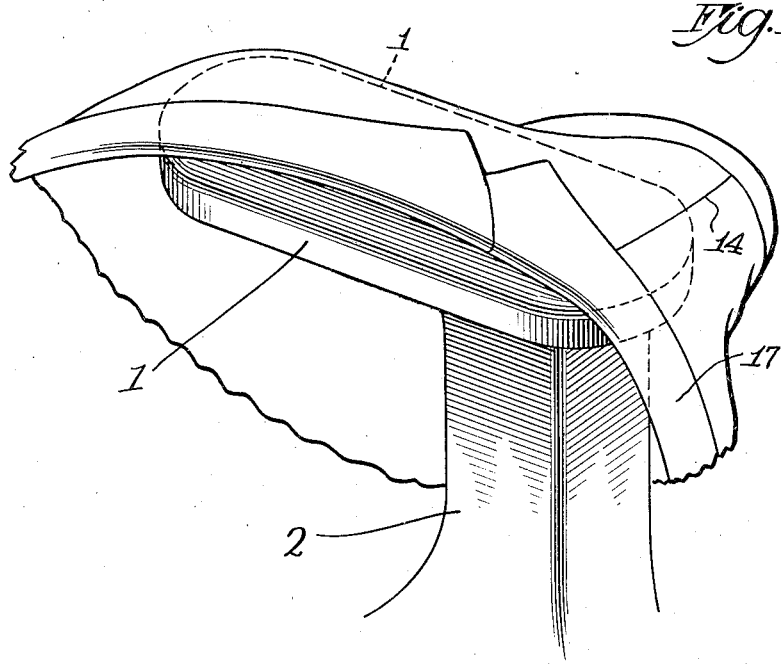
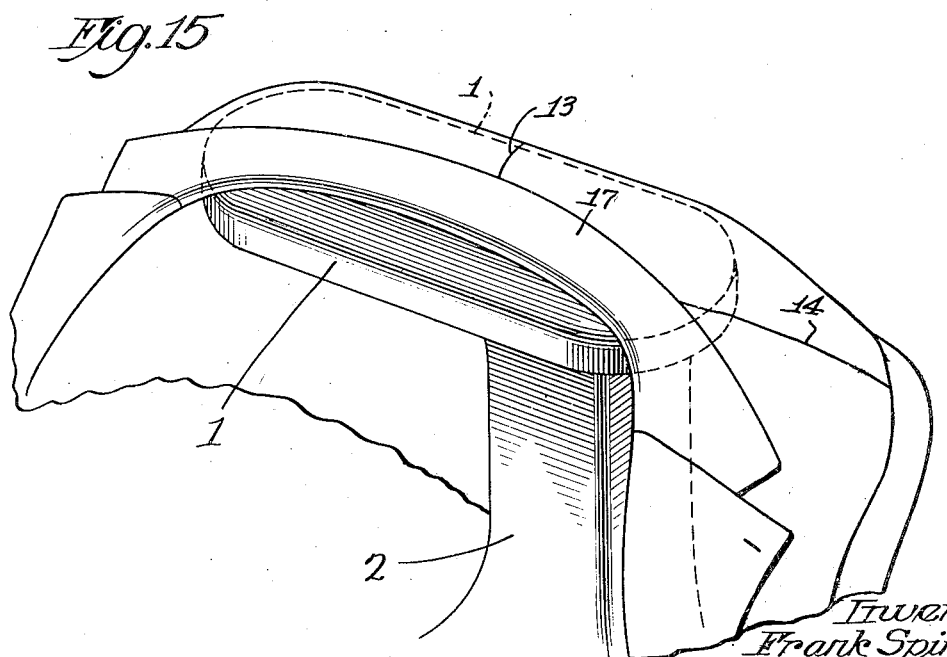
Inventors
Frank Spina
Charles G. Green
By Arthur F. Durand
Atty.

April 20, 1937.  F. SPINA ET AL  2,077,440
MACHINERY FOR PRESSING CLOTHING
Filed Jan. 18, 1935    8 Sheets-Sheet 8
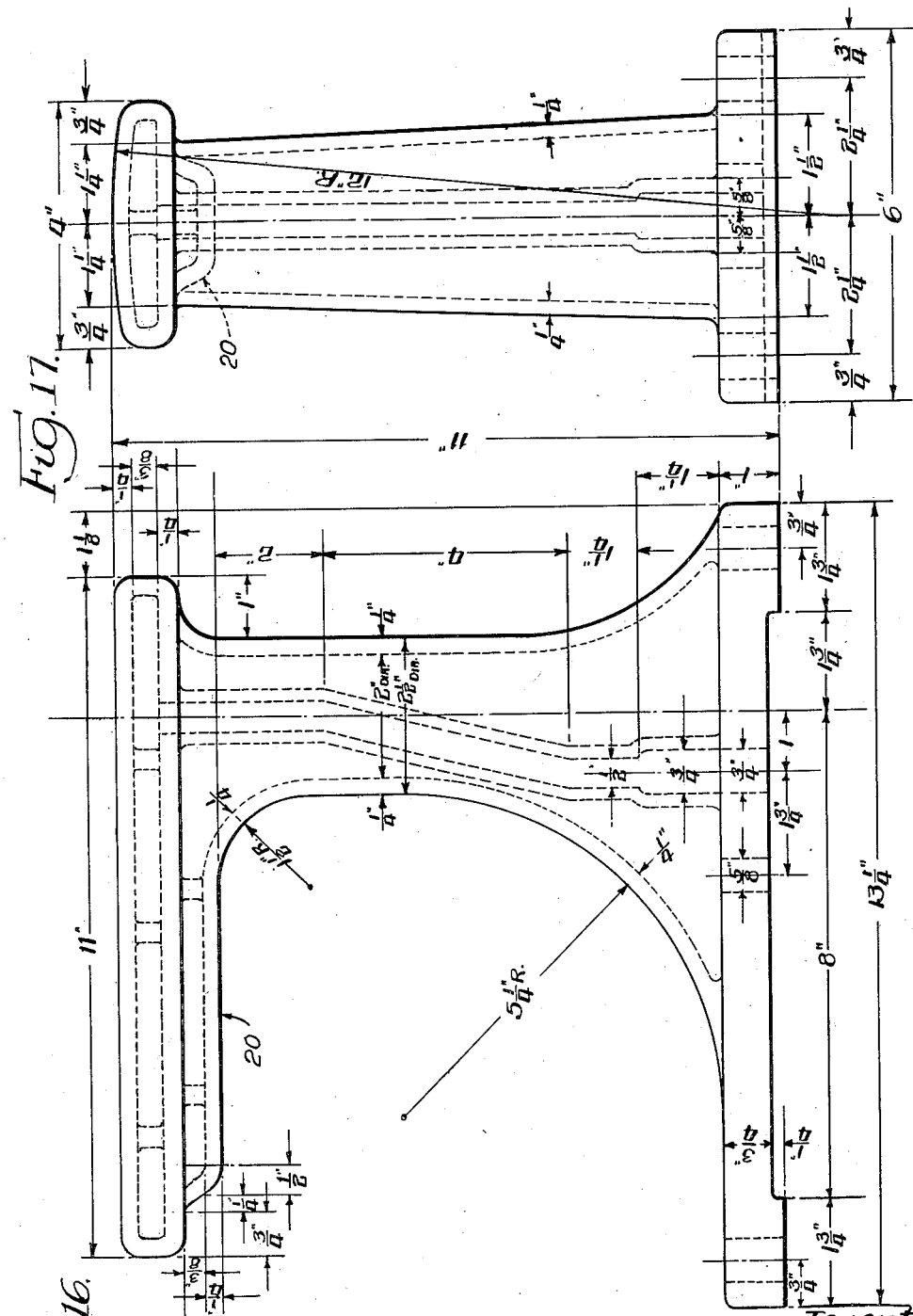
Inventors
Frank Spina
Charles G. Green
By Arthur H. Durand atty.

Patented Apr. 20, 1937

2,077,440

UNITED STATES PATENT OFFICE 2,077,440

MACHINERY FOR PRESSING CLOTHING

Frank Spina and Charles G. Green, Chicago, Ill.; said Green assignor of an undivided interest to Alfred Decker & Cohn, Inc., Chicago, Ill., a corporation of Illinois Application January 18, 1935, Serial No. 2,352

5 Claims. (Cl. 38—66)

This invention relates to the art of pressing clothing, and more particularly to the machines employed in clothing factories for pressing men's clothing, and more especially machines of this kind for pressing the coats of such clothing.

Generally stated, the object of the invention is to provide a novel and improved construction and arrangement whereby less machinery, a less number of machines, is necessary for the pressing of coats, and less handwork, and whereby, if desired, all handwork can be eliminated and an entire coat can be pressed on one and the same pressing machine.

To the foregoing and other useful ends, the invention consists in matters hereinafter set forth and claimed and shown in the accompanying drawings, in which—

Fig. 3 is a bottom plan view of what is called the "upper buck" of the said machine.

Fig. 4 is a similar view of the upper side of what is called the "lower buck" of said machine.

Fig. 5 is a perspective view illustrating one of the steps of the method of using said machine.

Figs. 6 to 15 are similar views showing other steps involved in said method.

Fig. 16 is a diagrammatic side elevation of the lower buck of the machine, showing desirable dimensions thereof.

Fig. 17 is a similar end elevation diagram of said buck.

Figure 1:
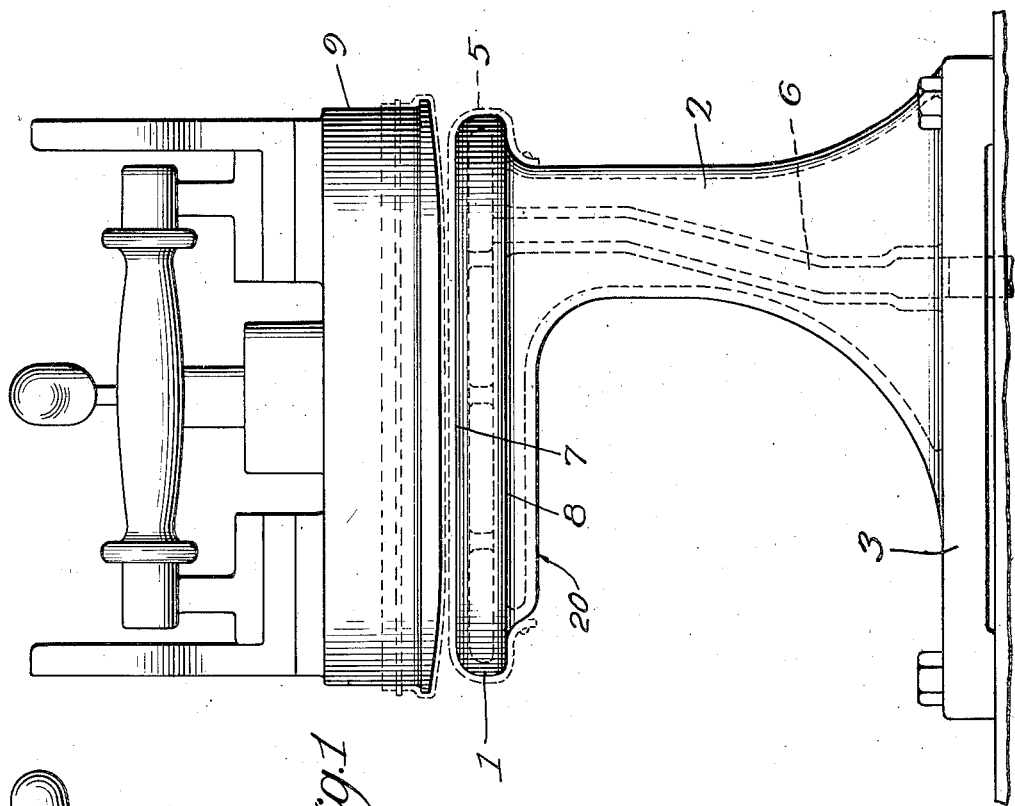
Fig. 1 is a front elevation of a pressing machine embodying the principles of the invention.
Figure 2:
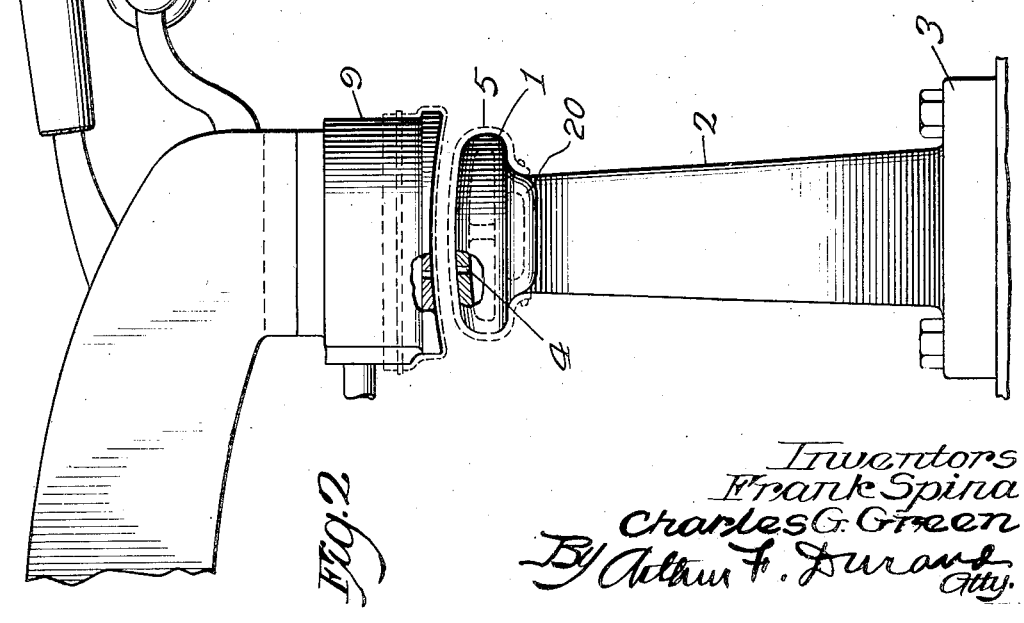
Fig. 2 is a side elevation of said machine, with certain portions broken away, and with certain portions in vertical section, to facilitate the illustration of the invention.

As thus illustrated, referring to Figs. 1 to 4 inclusive, the invention comprises a lower or stationary buck 1, of the shape and form shown in Figs. 1, 2 and 4 of the drawings, having an integral pedestal 2 on a base 3, preferably all cast in one piece. The said buck is hollow, and its top is provided with small openings 4, and in use the top of the buck is provided with the usual covering 5, of cloth or other suitable material, and a passage 6 extends downwardly through the pedestal 2, from the interior of the buck, and is connected with the usual vacuum apparatus, whereby the steam is drawn through the cloth of the garment resting on the buck. Inasmuch as this lower buck, in order to serve all of the different purposes for which it is used, in the different steps of pressing the garment, must have approximately certain proportions and dimensions, it may be stated that for coats of different sizes ranging from practically the smallest size to the largest size made in clothing factories, the width of the buck should be approximately four inches and its length should be approximately eleven inches. The shorter or right-hand end of the buck, as shown in Fig. 1 of the drawings, should overhang the pedestal 2 approximately one inch, while the longer or left-hand end of the buck, the end at the left, should overhang the pedestal approximately seven and one-half inches. Looking at the buck 1 in Fig. 2 of the drawings, the top thereof should be formed on the line of a circle struck from a radial point approximately twelve inches below, and the distance between the top line 7 of the buck and the lower line 8 may be approximately one inch. The opposite ends of the buck are preferably formed on the lines of circles, as shown in Fig. 4 of the drawings, and the edges of the buck are advantageously rounded, as shown in Figs. 1 and 2 of the drawings. The other dimensions for an average size coat are as shown in Figs. 16 and 17 of the drawings. These dimensions are ideal for coats of average size, and they insure good results for coats above and below the average size, but for coats of maximum size some off-machine or hand pressing may be necessary or desirable, and the same is true of the minimum sizes.

The upper or swinging buck 9 may be of any suitable known or approved construction, and may be mounted and equipped in the ordinary manner, so that it may be swung up to release the garment, and then swung down on another portion of the garment, to press the latter upon the lower buck. Preferably, while the upper buck is shaped substantially like the lower buck, as shown in Fig. 3 of the drawings, it is preferably a little wider and a little longer than the lower buck, to the extent shown in the drawings, in order to obtain the desired results in the pressing of the garment between the two bucks. As shown in Fig. 2 of the drawings, it will be seen that the upper buck 9 is concave on its lower side, thereby to co-operate in the desired manner with the convex upper surface of the lower buck.

Figure 6:
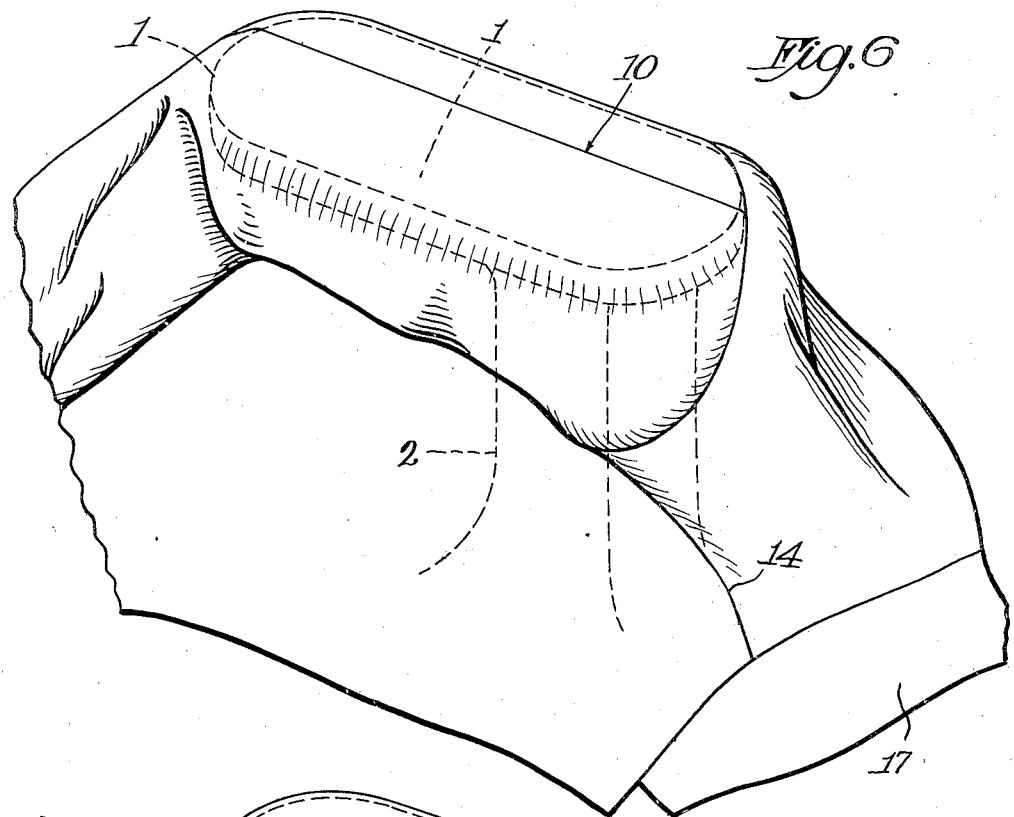
Figure 7:
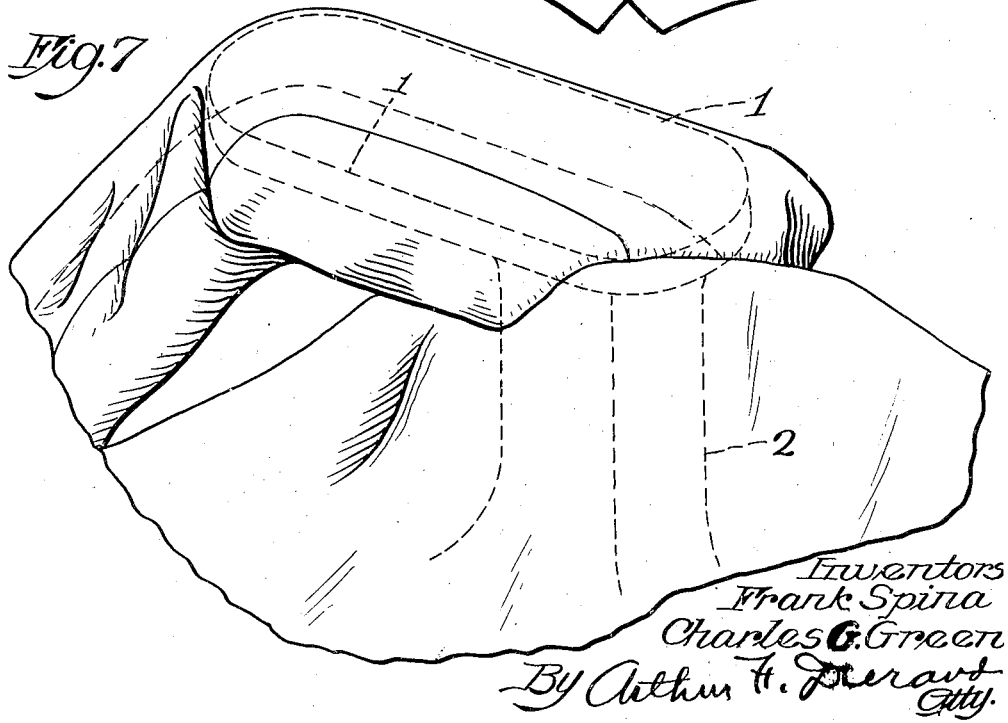
Figure 8:
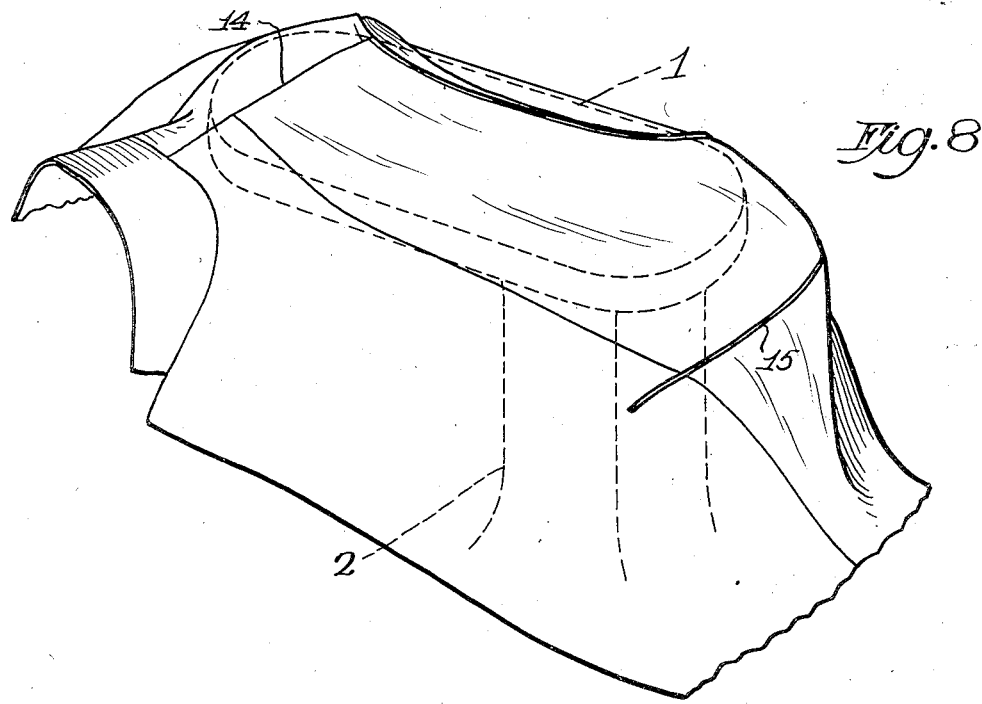
Figure 9:
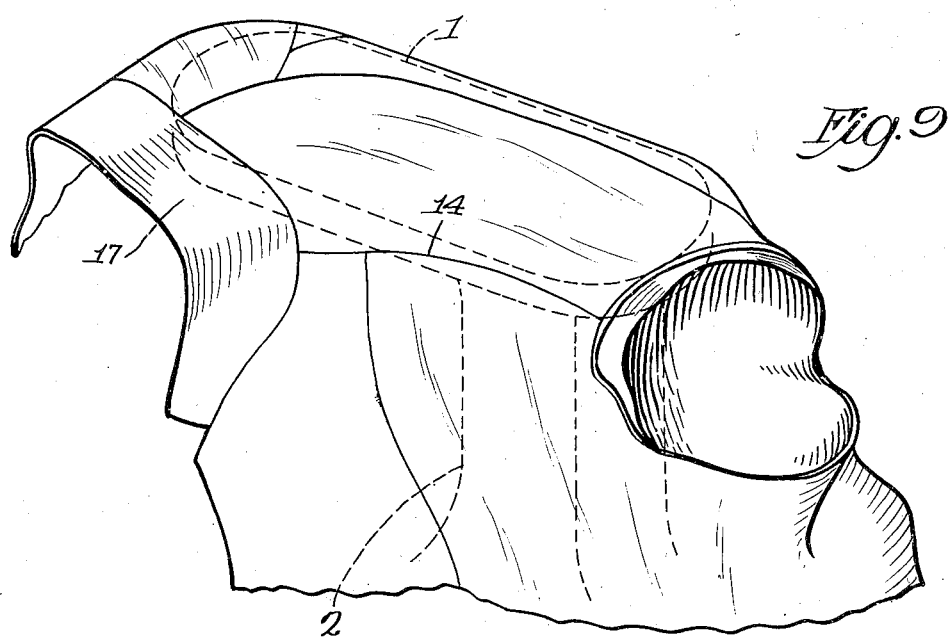
Figure 10:
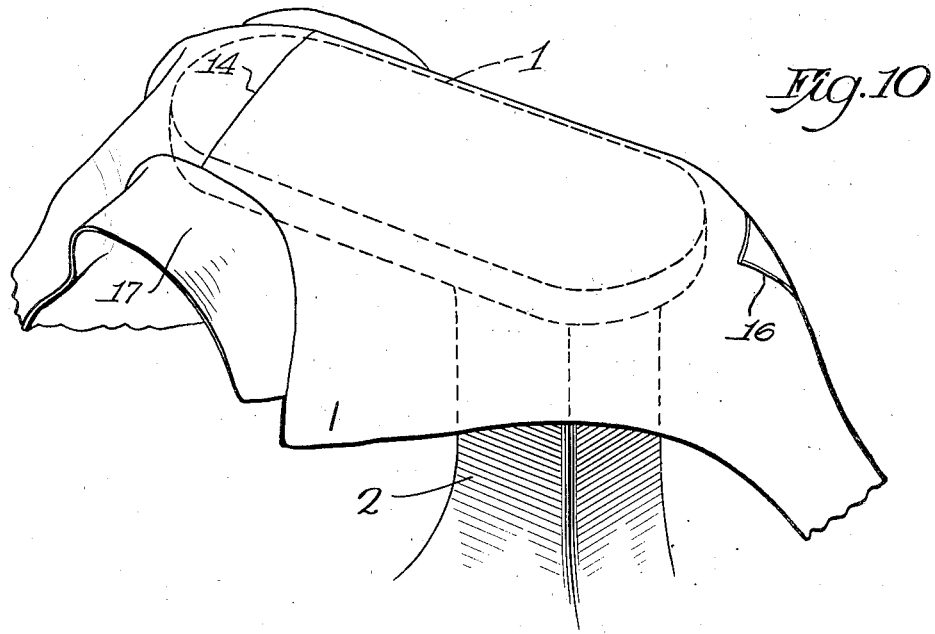
Figure 11:
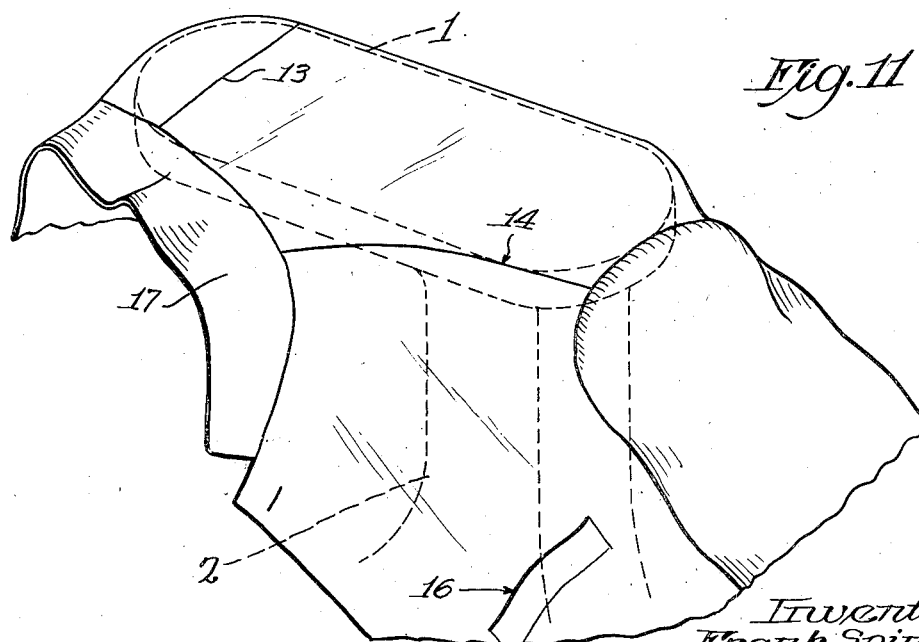

Referring to Fig. 6 of the drawings (the coat is shown right side out), this shows what may be the first step in using the machine shown and described. In this view, the buck is shown in dotted lines, with its longer end inserted in the right sleeve of the coat, and this operation or step in the method of pressing the coat is known as "pressing and blocking back seam of sleeve", which seam is shown at 10 in Fig. 6 of the drawings. In Fig. 7 (the coat is shown right side out), which may be the next step or operation in pressing the coat, the garment has been shifted to bring the front of the same sleeve into position on top of the lower buck, and this operation is, in practice, known as "removing crease from front of sleeve". In Fig. 8 (the coat is shown inside out), which may be the next step, the garment has been shifted to a position to perform what is known as "pressing upper part of body lining from shoulder down", the coat having been laid wrong side out on the lower buck for this particular step. The right shoulder of the coat is shown, and the left shoulder will be handled in the same way. In Fig. 9 (the coat is shown inside out), the operation illustrated, which may be the next step, is, in practice, called "pressing the yoke lining", the coat having been adjusted into position on the lower buck for this purpose. In Fig. 10 (the coat is shown right side out), which may be the next step in the process of pressing the coat, the operation of what is known as "pressing the shoulder" is being performed. The left shoulder is shown, and the right shoulder will be handled in the same way. In Fig. 11 (the coat is shown right side out), which may be the next step, the operation illustrated is, in practice, known as "pressing the outside of back of shoulder". In Fig. 12 (the coat is shown right side out), the lower buck 1 is again shown inside of the sleeve, for the purpose of performing the operation known as "blocking the sleeve" by adjusting the coat on the buck in the manner shown. In Fig. 13 of the drawings (the coat is shown inside out), the operation called "arm hole creasing" is being performed, and this may be the next step in the general process or method of pressing the coat on the machine shown and described. In Fig. 14 (the coat is shown right side out), the operation known as "shaping and collar pressing" is being performed, with a portion of the lapel and a portion of the collar in position on the buck 1 in the manner shown. In Fig. 15 (the coat is shown right side out), the operation of "shaping and collar pressing" for the middle portion of the collar, is being performed with the garment in position as shown. Finally, as the next step in the method of using the machine for pressing certain portions of the coat, the operation shown in Fig. 5 is performed (the coat is shown right side out), which is known as "pocket flap crease removal", the crease 11 on the pocket, caused by the edge 12 of the flap of the pocket, in some previous creasing operation, being removed by this operation. Or, if desired, the operation shown in Fig. 5 can be made the first of the series of operations enumerated.

The foregoing, it will be seen, is an explanation of the steps involved in pressing one sleeve and practically one side of the coat. It will be readily understood that the operations involved for the pressing of the other sleeve, and the other side of the coat, are exactly the same, except that one set of the operations is a right, so to speak, and the other is a left, but the shape and dimensions of the buck 1 are such that the latter will accommodate the garment in any of the different positions shown and described, for both sleeves and for both sides of the coat.

The pressing operations shown and described are mostly concerned, it will be seen, with the sleeves and collar and lapels and seams of the coat for these portions of the garment, and it will be readily understood that the back of the coat, and the other flat sections of the garment, may be given what is called "flat pressing" on another machine, if desired, but the shape and dimensions of the buck 1 are also such that the flat pressing can also be done on this buck.

Previously, the pressing of a coat, by the various steps or operations shown and described, required the use of several pressing machines of the general character shown and described. There was also more or less hand-pressing necessary, with previous methods, and with the previous machinery. However, with the machine shown and described, and with the method of use thereof, as shown and described, all hand-work in pressing a coat is eliminated, the entire coat being machine-pressed. And, as indicated, the entire coat can be pressed on the one machine shown and described, if necessary, in order to avoid the expense of additional machinery. But other machines can be used for the flat pressing, if desired, as with larger bucks, or bucks of different shapes, the flat pressing may in some cases be done faster than would be possible on the machine shown and described.

It will also be understood that while the different steps or operations shown and described, as enumerated, constitute one order in which these steps can be performed, and one method of using the machine, it is obvious that the clothing presser is at liberty to switch the steps around, and rearrange them, to some extent, if so desired, but regardless of the order in which the steps are performed, or whether they are each performed exactly as shown and described, it is nevertheless true that these various operations that were heretofore performed on different machines, are all capable of being performed on the one machine shown and described. This, therefore, cuts down or reduces the amount of money necessarily invested in pressing machinery, very considerably, and because of this and the elimination of handwork, the cost of production is substantially reduced.

In addition, the shape and dimensions of the lower buck 1 are not only such that the various operations previously performed on different bucks are all capable of being performed on this one buck, but, in addition, the buck is of such character that a high quality of pressing is insured, so that while the entire garment is machine-pressed, it nevertheless has the quality and general appearance of a carefully hand-pressed garment.

The dimensions of the buck as given are not arbitrary, of course, and while they might be varied somewhat, without departing from the spirit of the invention, it is nevertheless true that better results have been found possible with the buck 1 constructed as shown and described, with its size and shape as shown and described, as with these proportions it has been found possible to perform all of the several operations on this one buck, that were previously possible only on two or more different machines having bucks of different shapes and dimensions.

With this new method, therefore, for the pressing of men's coats, the cost of production is substantially reduced, as well as the cost of equipment.

As a matter of general observation, it will be understood, of course, that the shoulder and lapel and sleeve and pocket creasing operations, illustrated for one side of the coat, are practically duplicated for the other side of the coat, and for this reason the illustration of all of the pressing operations, in the drawings, is unnecessary.

Also, it will be seen that conventional parts of a coat are shown, and it will be understood that in Fig. 11, for example, the line 13 indicates the center or back seam of the coat, while in Fig. 10 the line 14 indicates the shoulder seam. In Fig. 8, the lines 15 indicate the inside breast pocket of the coat, while in Fig. 10 the lines 16 indicate the outside breast pocket of the coat, and in all of the figures 17 indicates the collar of the coat, and in Fig. 7 the front sleeve crease is indicated at 18 and the front seam 19, as shown.

It will be seen that the bottom of the lower buck 1 is substantially flat and horizontal, and that the bottom of the longer overhang has a longitudinal rib 20, which is really a part of the pedestal 2, as it is only needed for strength, and is of less width than the buck, so that the latter has a substantial overhang at each side of the rib, and the latter preferably being of less length than this portion of the body of the buck, so that the rib stops short of the outer end of the buck. In this way, it will be seen, the body of the buck overhangs the said rib to about the same extent at the end of the latter, as it does at the sides thereof. This is of importance, it will be seen, not only because it provides the longer portion of the buck with a substantially strengthened formation, against the downward pressure of the upper buck 9, so that any danger of breakage of the lower buck is precluded, but in addition this strength is obtained without thickening the edges of the body of the buck in a manner that would interfere with the proper adjustments of certain portions of the garment thereon. If the rib were as wide as the body of the buck, and if the latter had the same vertical thickness everywhere, as is necessary to strengthen the buck against the downward pressure of the upper buck, the edges of the lower buck would be too thick for convenient and advantageous adjustment of certain portions of the garment thereon. However, by providing the rib in question, and making it of less width than the buck, the latter will accommodate itself to various portions of the garment, more readily, inasmuch as the cloth can be stretched horizontally under the rib, and then pulled upwardly and outwardly in inclined planes across the overhang between the side edges of the rib and the side edges of the body of the buck, for certain operations involved in the pressing of the sleeves and shoulders of the garment.

What we claim as our invention is:

1. A pressing machine for coats comprising an elongated lower stationary buck, and an upper buck adapted to be moved into pressing engagement with the upper pressing face of the lower buck for cooperation therewith, said lower buck having parallel side edges and being rounded at both ends thereof, the pressing face of the lower buck being substantially flat longitudinally and convexly curved in transverse cross section, and said lower buck having a width of four inches, a thickness of one inch and a length of eleven inches, and a pedestal for supporting the lower buck, said pedestal being secured to the lower face of said lower buck so as to leave an overhang at one end thereof of at least an inch and an overhang at the other end thereof of seven inches or more, whereby to enable the pressing of an entire coat of average size upon said single lower buck member.

2. A structure as specified in claim 1, the body of said lower buck being substantially flat on the bottom thereof, and being of uniform vertical thickness along a longitudinal line, with a longitudinal rib on the bottom of the longer overhang, extending from the pedestal to a point adjacent the end of the buck, and of less width than the latter, to strengthen said longer overhang against the downward pressure of the upper buck, and to also in effect reduce the thickness of the edges of the lower buck, whereby to advantageously accommodate the garment in certain positions thereon.

3. A structure as specified in claim 1, said longer overhang having a longitudinal rib on the under side thereof, of less width than the lower buck, and of less vertical thickness than the latter.

4. A structure as specified in claim 1, said longer overhang having a longitudinal rib on the bottom thereof, of less width than the lower buck, so that the latter has a substantial lateral overhang at each side of said rib, and there being substantially the same amount of overhang at the outer end of the rib.

5. A structure as specified in claim 1, said longer overhang having a longitudinal rib on the under side thereof, of less width than the lower buck, so that the vertical thickness of the shorter overhang is less than the total vertical dimension of the longer overhang and said rib.

FRANK SPINA.
CHARLES G. GREEN.